Feb. 19, 1935.  G. W. CLARK  1,991,789
BICYCLE CONSTRUCTION
Filed Feb. 7, 1934
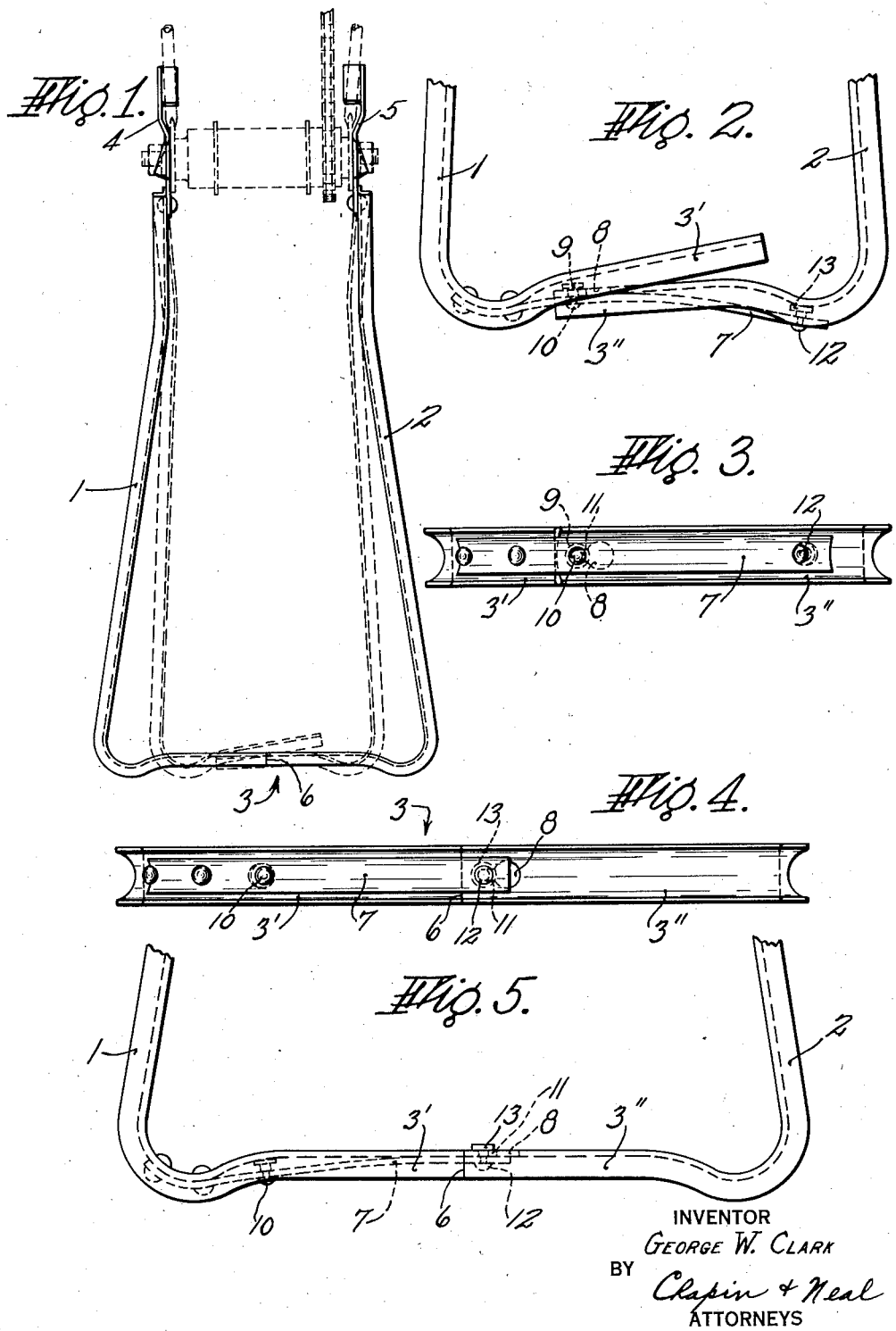
INVENTOR
GEORGE W. CLARK
BY Chapin & Neal
ATTORNEYS Patented Feb. 19, 1935

1,991,789

UNITED STATES PATENT OFFICE 1,991,789

BICYCLE CONSTRUCTION

George W. Clark, Westfield, Mass., assignor to The Westfield Manufacturing Company, Westfield, Mass., a corporation of Massachusetts Application February 7, 1934, Serial No. 710,156

3 Claims. (Cl. 208—75)

This invention relates to a specific detail of bicycle construction. It has to do with an improved form of bicycle stand, of the kind that is attached to the rear of the bicycle, ordinarily carried out of operating position by a snap attachment to the rear of the mudguard, and swung down to vertical position when it is desired to elevate the rear wheel and stand the bicycle at rest.

A bicycle stand of this kind is shown in the drawing but with my invention applied thereto.

Referring to the drawing:

Fig. 1 is a top view of the stand, showing it fastened to the rear axle of a bicycle (the parts of the bicycle, as rear axle, hub, and chain, being merely indicated by dotted lines). The full line drawing of the stand in this figure shows it in the position as normally held by the snap hook on the mudguard. The dotted line position of the stand in this figure shows it in a temporary position desired for the purposes of my invention;

Fig. 2 is a detail view of the outer part of the stand in position for crating with the bicycle in assembled condition;

Fig. 3 is an end view of Fig. 2;

Fig. 4 is an end view of Fig. 1; and

Fig. 5 is a view similar to Fig. 2 with the parts in a different position.

A stand of this kind is ordnarily made at a low cost by bendng the legs 1 and 2 and cross piece or foot 3 out of a single piece of channel-shaped metal. Stamped metal parts 4 and 5 are pivoted at the ends of the legs and used to connect the stand to the bicycle by bolting it at the ends of the rear axle, as is well known. When connected, the legs diverge (as indicated in Fig. 1) from the space between the ends of the rear axle (between parts 4 and 5) to the much longer length of the foot 3. The latter is enough wider than the bicycle to make a good broad foot for the stand.

This general arrangement has worked out exceedingly well and such a stand is almost always supplied with every bicycle sold. It is the common practice for the bicycle manufacturers to ship their bicycles in crates. The stand cannot ordinarily be assembled and properly positioned on the bicycle all ready to use when shipped in the crate, as the wide foot portion 3 of the stand is wider than the crate commonly used for the bicycle. So the common practice is to ship the stand as a separate part and merely put it in the crate, for the boy to put on the bicycle after he uncrates it.

I have found out that in many instances a boy does not properly disconnect the rear wheel from the bicycle, apply the stand, and get the parts together for proper operation. As a consequence, the rear wheel assembly, with its driving connections, that were all properly made and adjusted at the factory, is put out of adjustment because the boy has spoiled it in the necessary work of applying the stand. The bicycle does not give him satisfaction, even when brand new, and the manufacturer has lost a part of his goodwill. I have found the trouble all arises due to the fact that the bicycle manufacturer for his own convenience has shipped the simple stand unassembled and overlooked the fact that applying the simple stand involves the probability of spoiling the driving assembly adjustment at the rear wheel, all of which was made properly and carefully at the factory.

So the purpose of this invention is to change the manufacturer's practice; to provide a stand of the general type he is accustomed to, and change it just enough to persuade the bicycle manufacturer to complete his bicycle assembly at the factory with the stand in place, crate it that way, and leave only an extremely simple operation for the boy to perform in bringing the stand to the right condition after he uncrates his bicycle.

With this in view I cut the foot of the stand 3 at 6 so that the part 3' can overlap the part 3", as shown in Fig. 2. The channel shape of the parts permits them to nest together in this overlapping position. I provide a long leaf spring 7 that can be permanently riveted at one end to part 3' and overlie part 3" at all times. Near the end of part 3", I provide a hole 8 of a size to take the head 9 of a pin 10 fixed on spring 7 at a point spaced from the end of part 3". After head 9 passes through hole 8 the pin 10 can move into the slot 11 with the shoulders of head 9 underlying the edges of the slot. This will hold the parts 3' and 3" in overlapped position, as shown in Fig. 2. I also provide another pin 12 with head 13 on spring 7 for a purpose to be described.

With this construction the manufacturer assembles the stand and rear axle assembly of the bicycle in exact condition for use before it leaves the factory. In crating the bicycle the legs 1 and 2 of the stand are sprung together with parts 3' and 3" overlapping and nested and held in such position by leaf spring 7 with its pin 10 and head 9 passing through hole 8 of part 3' and under shoulders 11. In this position (see Fig. 2) legs 1 and 2, due to their normally diverging shape and their attachment at the rear axle, have a strong tendency to spring apart. But they are held together at approximately the width of the bicycle and its crate, by engagement of pin 10 passed through hole 8 and under shoulder 11, all in the right position for crating the bicycle, as shown by the dotted line position in Fig. 1.

When the bicycle is uncrated all the boy has to do is to push parts 3' and 3" slightly together to disengage pin 10 and its head 9 from part 3". Then legs 1 and 2 will spring to their normal diverging position. Pin head 12 and its head 13 will now be pressed into hole 8 and the pin will move to slot 11. In this position parts 3' and 3" of foot 3 will be in alignment, their ends will be abutting, and the parts will be held there, as in Figs. 1 and 5, for bicycle stand use. The leaf spring 7 will overlap the cut parts 3' and 3" of foot piece 3, and the whole will be braced for permanent use in this position.

The contrivance as described for accomplishing my purpose is simple and inexpensive to make as an integral part of the stand. When the stand is in use, the additional parts I have added are all substantially nested and hidden in the channel portion of the stand metal. They will not detract from the normal function and appearance of the stand and will add almost nothing to its cost. Yet the effect of my contrivance will save a lot of trouble between the bicycle manufacturer and his customers.

I claim:

1. A bicycle stand comprising in combination two diverging leg members adapted to have their inner ends attached to opposite sides of the rear fork, an inturned foot member at the outer end of each leg member in the form of a bend from the leg member, each leg and its foot member being made integral from a single piece of metal, said foot members being normally adapted to lie in aligned toe to toe relation when the leg members are in diverging position and attached to the bicycle, cooperating means on the foot members to hold them normally and rigidly in said relation, said means being movable to permit the foot members to overlap and bring the leg members closer to the side of a bicycle whereby the latter may be assembled with the stand at the factory and conveniently shipped in assembled relation.

2. A bicycle stand including a stirrup-shaped metal bar of channel cross-section, the foot portion being transversely split to permit the halves to overlap and nest in the channel-shaped section, and a brace for the foot portion at all times overlying the overlapping portions and in position to function when the halves are aligned at said split so as to hold the foot portion rigidly as a single piece, all for the purpose described.

3. In a bicycle stand of the kind described, the combination of a ground bearing cross support made of two metal parts each of channel cross-section, and a long leaf spring attached to and adapted to lie in one channel part and overlie the other, said spring and the other channel part having a cooperating pin and slot and hole means for attaching the two parts in two positions, one for the parts to overlap and the other for them to be held in rigid aligned position, all for the purpose described.

GEORGE W. CLARK.